US009341134B2

United States Patent
Ikemoto

(10) Patent No.: US 9,341,134 B2
(45) Date of Patent: May 17, 2016

(54) CONTROL APPARATUS FOR INTERNAL COMBUSTION ENGINE

(75) Inventor: Masato Ikemoto, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/884,398

(22) PCT Filed: Jan. 26, 2012

(86) PCT No.: PCT/JP2012/051664
§ 371 (c)(1),
(2), (4) Date: May 9, 2013

(87) PCT Pub. No.: WO2013/111299
PCT Pub. Date: Aug. 1, 2013

(65) Prior Publication Data
US 2014/0366846 A1    Dec. 18, 2014

(51) Int. Cl.
| F02D 41/40 | (2006.01) |
|---|---|
| F02D 41/32 | (2006.01) |
| F02D 41/24 | (2006.01) |
| F02D 41/12 | (2006.01) |
| F02D 41/14 | (2006.01) |
| F02M 55/02 | (2006.01) |
| F02M 61/18 | (2006.01) |
| F02M 45/04 | (2006.01) |

(52) U.S. Cl.
CPC ............ F02D 41/32 (2013.01); F02D 41/247 (2013.01); F02D 41/402 (2013.01); *F02D 41/123* (2013.01); *F02D 41/1497* (2013.01); *F02D 2200/0602* (2013.01); *F02D 2200/1012* (2013.01); *F02M 45/04* (2013.01); *F02M 55/025* (2013.01); *F02M 61/1806* (2013.01); *Y02T 10/44* (2013.01)

(58) Field of Classification Search
CPC ....... F02M 45/00; F02M 61/06; F02M 45/02; F02M 45/04; F02M 51/06; F02D 41/402; F02D 41/403; F02D 41/405
See application file for complete search history.

(56) References Cited

U.S. PATENT DOCUMENTS

| 4,470,548 A * | 9/1984 | Ushimura .................. 239/533.3 |
|---|---|---|
| 2006/0054132 A1 | 3/2006 | Uchiyama |
| 2008/0172169 A1* | 7/2008 | Kuronita et al. ............... 701/103 |

FOREIGN PATENT DOCUMENTS

| JP | 2000-8883 A | 1/2000 |
|---|---|---|
| JP | 2004-278463 A | 10/2004 |
| JP | 2005-076529 A | 3/2005 |
| JP | 2009-115068 A | 5/2009 |

* cited by examiner

*Primary Examiner* — Lindsay Low
*Assistant Examiner* — Jacob Amick
(74) *Attorney, Agent, or Firm* — Sughrue Mion, PLLC

(57) ABSTRACT

A control apparatus for an internal combustion engine includes a fuel injection valve having a nozzle body that includes a fuel receiving part provided at a downstream side of a seat part with which a seat contact part comes into contact, and a plurality of nozzle holes. The control apparatus executes one or a plurality of small injections during one cycle in addition to main injection. Further, the control apparatus increases fuel injection amount of a first small injection at the current cycle at the time of low load operation while decreases the fuel injection amount of the first small injection at the time of high load operation, when post injection has not been executed in the last cycle and the small injection is executed first at the current cycle in a case in which a variation in the learned value for fuel injection amount is present.

4 Claims, 6 Drawing Sheets

CONTROL APPARATUS FOR INTERNAL COMBUSTION ENGINE

CROSS REFERENCE TO RELATED APPLICATIONS

This application is a National Stage of International Application No. PCT/JP2012/051664 filed Jan. 26, 2012, the contents of all of which are incorporated herein by reference in their entirety.

TECHNICAL FIELD

The present invention relates to a control apparatus for an internal combustion engine, and particularly to a control apparatus for an internal combustion engine including a fuel injection valve that is capable of directly injecting fuel into a cylinder.

BACKGROUND ART

So far, for example, Patent Document 1 discloses a control apparatus for an internal combustion engine that executes learning control for small fuel injection amount in order to improve the accuracy of small injection such as pilot injection that is included in the multi injection. More specifically, this learning control of the small fuel injection amount executes a fuel injection (small injection) with small amount when a fuel cut operation is performed at the time of deceleration, and is executed based on the relation between the fuel injection amount at this time and a generated torque of the internal combustion engine.

Meanwhile, the following configuration is known as that of a fuel injection valve used for an internal combustion engine. More specifically, a fuel injection valve is known which includes a needle valve that has a seat contact part at its distal end, and a nozzle body that has a seat part with which the seat contact part comes into contact, and further includes a fuel receiving part (so-called suck or the like corresponding thereto) formed at a downstream side of the seat part, and at least one nozzle hole formed at a downstream side of the seat part.

According to the fuel injection valve having the configuration described above, injection characteristics such as injection amount characteristics change whether the valve is in a state in which the fuel amount charged in the fuel receiving part is large (liquid-tight state) or a state in which the fuel amount charged in the fuel receiving part is small (gas-tight state). Therefore, if the learning control of the small fuel injection amount described in Patent Document 1 is executed in the internal combustion engine including a fuel injection valve having the aforementioned configuration, the fuel injection amount actually injected from the needle holes fluctuates depending on whether the internal state of the fuel receiving part is in the liquid-tight state or the gas-tight state. As a result of this, a variation (erroneous learning) may occur in the learned value of the fuel injection amount. If a proper correction for the fuel injection amount by means of the small injection such as the pilot injection is not executed due to the influence of the variation of the learned value, there is a concern that misfire may occur at the time of low load operation or smoke emissions may increase at the time of high load operation.

Including the above described document, the applicant is aware of the following documents as related art of the present invention.

CITATION LIST

Patent Documents

Patent Document 1: Japanese Laid-open Patent Application Publication No. 2009-115068
Patent Document 2: Japanese Laid-open Patent Application Publication No. 2004-278463
Patent Document 3: Japanese Laid-open Patent Application Publication No. 2005-76529

SUMMARY OF INVENTION

The present invention has been made to solve the problem as described above, and has its object to provide a control apparatus for an internal combustion engine which can suppress an occurrence of misfire at the time of low load operation due to a variation in the learned value for fuel injection amount, or an increase in smoke emissions at the time of high load operation, in an internal combustion engine equipped with a fuel injection valve having a nozzle body that includes a fuel receiving part provided at a downstream side of a seat part with which a seat contact part of a needle valve comes into contact, and at least one nozzle hole.

The present invention is a control apparatus for an internal combustion engine, and includes a fuel injection valve which is capable of directly injecting fuel into a cylinder. The fuel injection valve includes a needle valve that has a seat contact part at its distal end, and a nozzle body that has a seat part with which the seat contact part comes into contact, a fuel receiving part formed at a downstream side of the seat part, and at least one nozzle hole formed at the downstream side of the seat part. The present invention further includes learning execution means, multi injection execution means and fuel injection amount correction means.

The learning execution means executes learning control of fuel injection amount for learning the fuel injection amount.

The multi injection execution means executes, using the fuel injection valve, one or a plurality of small injections during one cycle in addition to main injection for generating a torque of the internal combustion engine.

The fuel injection amount correction means increases the fuel injection amount of a first small injection at the current cycle at the time of low load operation while decreases the fuel injection amount of the first small injection at the time of high load operation, when post injection has not been executed at the last cycle of the internal combustion engine and the small injection is executed first at the current cycle in a case in which a variation in a learned value for fuel injection amount of the learning control is present.

According to the present invention, with the minimal correction, an occurrence of misfire due to insufficiency of the fuel injection amount with respect to a proper value can be suppressed at the time of low load operation while an increase in smoke emissions due to excess of the fuel injection amount with respect to a proper value can be suppressed at the time of high load operation, even under a situation in which the internal state of the fuel receiving part irregularly varies between the liquid-tight state and the gas-tight state.

In addition, the fuel injection valve in the present invention may be configured such that in a state in which the needle valve is seated on the seat part, part of the distal end of the needle valve shuts off a communication between the nozzle hole and the fuel receiving part.

In a case in which the fuel injection valve having a configuration described above is included, the internal state of the fuel receiving part irregularly varies between the liquid-tight state and the gas-tight state in the brand new state in which mechanical familiarity is not being ensured concerning the contact between the needle valve and the nozzle body. The present invention makes it possible to suppress an occurrence of misfire at the time of low load operation due to a variation in the learned value for the fuel injection amount and an increase in the smoke emissions at the time of high load operation in the case in which the fuel injection valve having such configuration is included.

In addition, the learning execution means of the present invention may include injection amount correction prohibition means that when a variation in a learning parameter of the learning control has converged, prohibits a correction for the fuel injection amount by the fuel injection amount correction means.

If the aforementioned variation has converged, it can be judged that the internal state of the fuel receiving part at the time of the learning is stable in the liquid-tight state. Therefore, according to the present invention, it is determined whether or not the variation has converged, and thus, an overcorrection can be prevented from being made by the processing of the fuel injection amount correction means.

DESCRIPTION OF EMBODIMENTS

First Embodiment

System Configuration of Internal Combustion Engine

Figure 1:
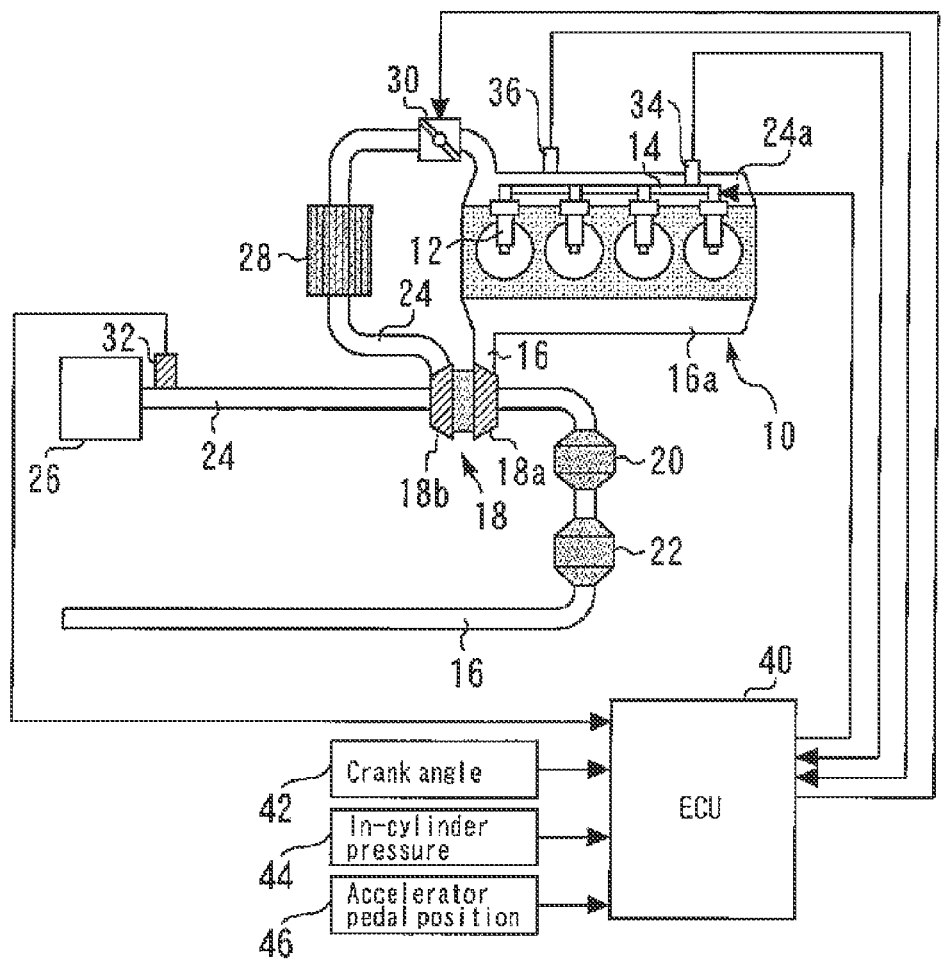
FIG. 1 is a diagram for explaining a system configuration of an internal combustion engine according to a first embodiment of the present invention.

FIG. 1 is a diagram for explaining a system configuration of an internal combustion engine 10 according to a first embodiment of the present invention. The system shown in FIG. 1 includes an internal combustion engine 10. It is assumed herein that the internal combustion engine 10 is a four cycle diesel engine (compression ignition internal combustion engine) 10 and is mounted in a vehicle to work as its power source. Although the internal combustion engine 10 of the present embodiment is of an in-line four cylinder type, the number and arrangement of cylinders in the internal combustion engine in the present invention is not limited to the foregoing.

A fuel injection valve 12 for directly injecting fuel into the cylinder is installed in each cylinder of the internal combustion engine 10. One example of the detailed configuration of a injection part of the fuel injection valve 12 will be described later with reference to FIG. 2. The fuel injection valve 12 of each cylinder is connected to a common common-rail 14. In the common-rail 14, a high pressure fuel which is pressurized by a supply pump (not shown) is supplied. Then, from this common-rail 14, the fuel is supplied to the fuel injection valve 12 of each cylinder. The exhaust gas discharged from each cylinder is collected by an exhaust manifold 16a to flow into an exhaust passage 16.

The internal combustion engine 10 includes a turbo supercharger 18. The turbo supercharger 18 includes a turbine 18a which is operated by exhaust energy of exhaust gas, and a compressor 18b which is integrally coupled to the turbine 18a via a connection shaft and is driven to rotate by the exhaust energy of the exhaust gas input to the turbine 18a. The turbine 18a of the turbo supercharger 18 is disposed at some point in the exhaust passage 16. At a downstream side of the turbine 18a in the exhaust passage 16, an oxidation catalyst 20 and a DPF (Diesel Particulate Filter) 22 are installed in series in order from the upstream side, in order to purify exhaust gas.

An air cleaner 26 is provided in the vicinity of the inlet of an intake passage 24 of the internal combustion engine 10. The air suctioned through the air cleaner 26 is compressed by the compressor 18b of the turbo supercharger 18 and thereafter is cooled by an intercooler 28. The suctioned air which has passed through the intercooler 28 is distributed by an intake manifold 24a to flow into each cylinder. An intake throttle valve 30 is installed in the intake passage 24 between the intercooler 28 and the intake manifold 24a.

An air flow meter 32 for detecting the amount of intake air is installed near the downstream of the air cleaner 26 in the intake passage 24. At the common-rail 14, a common-rail pressure sensor 34 is installed for detecting a fuel pressure in the common-rail 14. In addition, at the intake manifold 24a, an intake air pressure sensor 36 is installed for detecting an intake manifold pressure (boost pressure).

Furthermore, the system of the present embodiment includes an ECU (Electronic Control Unit) 40. Various sensors for detecting an operational state of the internal combustion engine 10, such as a crank angle sensor 42 for detecting an engine speed, and an in-cylinder pressure sensor 44 for detecting an in-cylinder pressure, in addition to the air flow meter 32, the common-rail pressure sensor 34 and the intake air pressure sensor 36 that are described above, are connected to an input section of the ECU 40. In addition, an accelerator position sensor 46 is connected to the ECU 40 to detect a depression amount of an accelerator (accelerator pedal position) of a vehicle equipped with the internal combustion engine 10. Further, various actuators for controlling the operation of the internal combustion engine 10, such as the fuel injection valve 12 and the intake throttle valve 30 that are described above, are connected to an output section of the ECU 40. The ECU 40 controls the operational state of the internal combustion engine 10 by driving the above described various actuators in accordance with predetermined programs and the outputs of those sensors.

Figure 2:
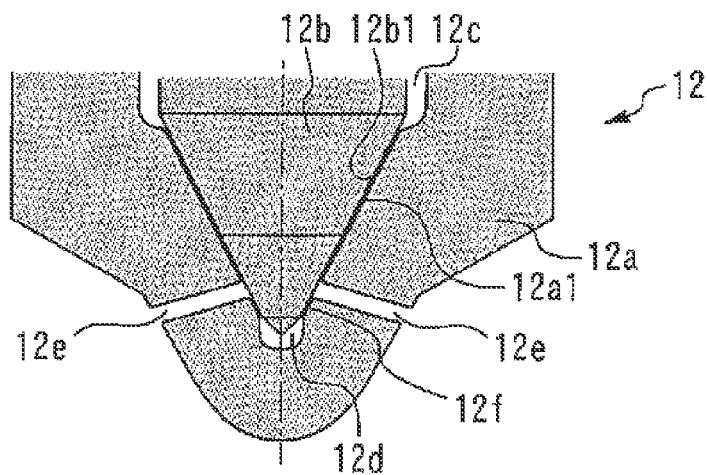
FIG. 2 is a sectional view illustrating a configuration of a distal end at a side in which fuel injection is executed in a fuel injection valve shown in FIG. 1.

FIG. 2 is a sectional view illustrating a configuration of a distal end at a side in which fuel injection is executed in the fuel injection valve shown in FIG. 1.

As shown in FIG. 2, the fuel injection valve 12 includes a nozzle body 12a. A needle valve 12b having a conically-shaped distal end is disposed inside the nozzle body 12a so as to reciprocally move. An internal fuel passage 12c through which fuel passes is formed between the inner peripheral surface of the nozzle body 12a and the outer peripheral surface of the needle valve 12b. A high pressure fuel is supplied into the internal fuel passage 12c from an upper side of the internal fuel passage 12c shown in FIG. 2.

On the inner peripheral surface of the nozzle body 12a in the vicinity of the conically-shaped distal end of the needle valve 12b, a seat part 12a1 is formed, on which a seat contact part 12b1 of the needle valve 12b can be seated. More specifically, the needle valve 12b is configured so as to be seated on the seat part 12a1 when an electromagnet (not shown) that is included by the fuel injection valve 12 does not generate a magnetic force. In this case, flow of fuel toward a downstream side of the seat part 12a1 is shut off. Further, the needle valve 12b is configured so as to leave the seat part 12a1 when the electromagnet receives a supply of an excitation current and generates a magnetic force. As a result of this, the high pressure fuel that is being stored upstream of the seat part 12a1 is supplied at the downstream side of the seat part 12a1.

Further, at the downstream side of the seat part 12a1 in the nozzle body 12a, a fuel receiving part (hereinafter, referred to as a "suck") 12d and a plurality of nozzle holes (two of them are illustrated in FIG. 2) 12e are formed as shown in FIG. 2. The suck 12d is a part at which fuel that is supplied from the upstream side at the time of opening the needle valve 12b can be received. The nozzle holes 12e are formed in the nozzle body 12a between the suck 12d and the seat part 12a1. In this connection, the plurality of the nozzle holes 12e are provided at a predetermined angular interval with the central axis line of the fuel injection valve 12 as a center so that fuel can be injected in a radial fashion.

Furthermore, in a state in which the needle valve 12b is seated on the seat part 12a1 (valve closed state) as shown in FIG. 2, a part of the distal end of the needle valve 12b is configured so as to be in contact with a wall surface 12f of the nozzle body 12a that is at a side closer to the suck 12d with respect to the nozzle holes 12e. As a result of this, in a state in which the needle valve 12b is seated on the seat part 12a1, the communication between the suck 12d and each nozzle hole 12e is also shut off. That is to say, the fuel injection valve 12 of the present embodiment is a fuel injection valve of a so-called VCO (Valve Covered Orifice) type.

[Learning Control for Small Injection Amount]

Now that exhaust emission regulations has been tightened, requirements for the accuracy of fuel injection with small amount such as pilot injection has been increasing. Accordingly, in the internal combustion engine 10 of the present embodiment, learning control of small injection amount is executed during operation in order to correct a change in the small injection amount due to individual variability or change with time of the fuel injection valve.

More specifically, according to the present learning control, fuel injection with a predetermined small injection amount is successively executed from one cylinder after another when the engine speed is decreased to a predetermined value during performance of a fuel cut operation at the time of deceleration. This fuel injection is executed at a timing at which combustion is enabled (for example, near the compression top dead center). The small injection amount is an amount that is smaller than a fuel amount necessary for an idle operation. According to the present learning control, a variation $\Delta Ne$ of engine speed in association with a fuel injection with the fuel amount described above is measured, and then an estimated injection amount $Qv$ is calculated which is equivalent to a torque that generates the above variation $\Delta Ne$ of engine speed. Further, a correction amount $\Delta Qv$ of fuel injection amount necessary to eliminate the difference between the estimated injection amount $Qv$ and an injection amount commanded to the fuel injection valve 12 is calculated as a learned value, and stored in the ECU 40. Furthermore, fuel injection is executed with a corrected fuel amount based on the aforementioned correction amount (learned value) $\Delta Qv$ when the small injection such as pilot injection is executed. In this manner, the learning control of the small injection amount is executed.

[Issue for First Embodiment]

As described above, according to the fuel injection valve 12 of the VCO type, at the time of finishing the lift of the needle valve 12b, fuel supply from the internal fuel passage 12c is shut off as a result of the needle valve 12b being seated on the seat part 12a1, and the communication between the suck 12d and the nozzle holes 12e is also shut off as a result of the distal end of the needle valve 12b coming into contact with the wall surface 12f. Thus, it is expected that basically a state in which the inside of the suck 12d during valve closing is filled with a liquid (hereinafter, referred to as a "liquid-tight state") will be realized.

However, when the fuel injection valve 12 is brand new, mechanical familiarity (lapping) is not being ensured concerning the contact between the needle valve 12b and the nozzle body 12a. In addition, the rotational displacement of the needle valve 12b inside the nozzle body 12a, generally, is not restricted, and therefore, the rotational position of the needle valve 12b with respect to the nozzle body 12a may vary for every lift operation. Because of these factors, when the needle valve 12b is seated on the seat part 12a1 in the brand new state, a gap may be formed between the distal end and the wall surface 12f depending on the aforementioned rotational position, and the communication between the suck 12d and the nozzle holes 12e may not be shut off.

Furthermore, fuel with high pressure of tens to hundreds of MPa is vigorously injected from the fuel injection valve 12. For this reason, in a case such as that the aforementioned gap is formed, even after the needle valve 12b is seated on the seat part 12a1, part of fuel in the suck 12d attempts to go outside via the aforementioned gap by the inertia. As a result of this, gas may enter into the suck 12d instead of the fuel that has been actually discharged from the suck 12d, and bubbles of the gas may be generated in the suck 12d.

When the in-cylinder pressure (that is, pressure outside the nozzle holes 12e) decreases as a result of reaching the expansion stroke under a situation in which the bubbles are present in the suck 12d as described above, the gas in the suck 12d expands. As a result, if the fuel in the suck 12d is extruded through the aforementioned gap by the expanded gas, there becomes a state in which the inside of the suck 12d is filled with the gas (hereinafter, referred to as a "gas-tight state").

Figure 3:
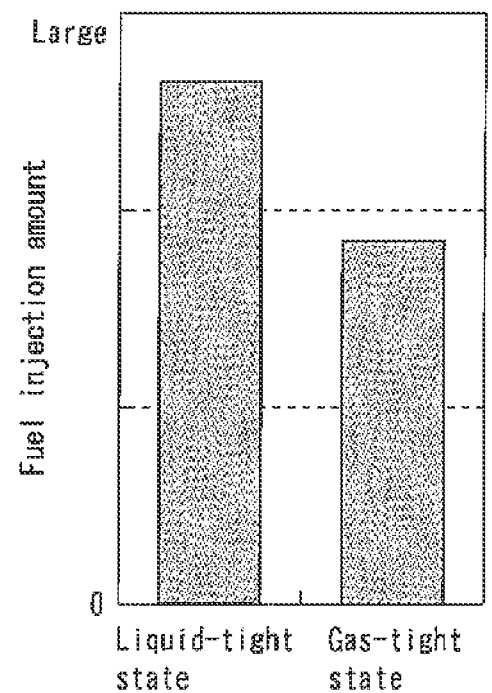
FIG. 3 is a diagram expressing fuel injection amounts that are injected from nozzle holes as compared between a liquid-tight state and a gas-tight state concerning the inside of a suck.
Figure 4:
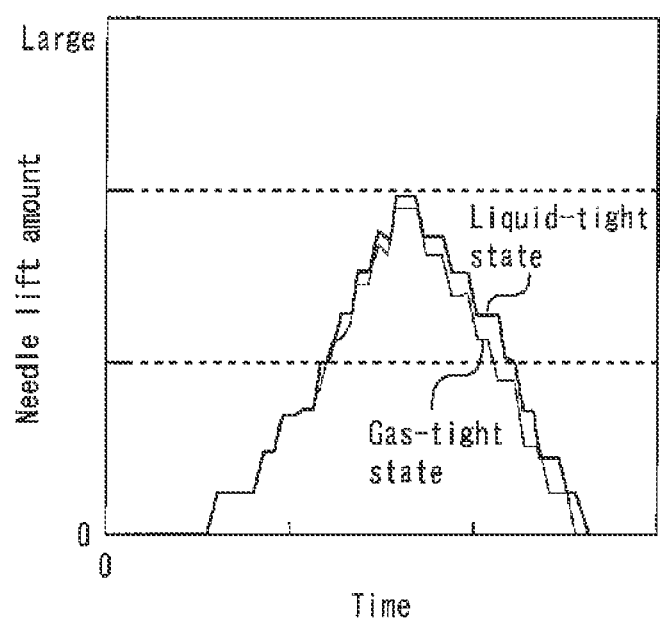
FIG. 4 is a diagram expressing the lift amounts of a needle valve as compared between the liquid-tight state and the gas-tight state concerning the inside of the suck.

FIG. 3 is a diagram expressing fuel injection amounts that are injected from the nozzle holes 12e as compared between the liquid-tight state and the gas-tight state concerning the inside of the suck 12d. In addition, FIG. 4 is a diagram expressing the lift amounts of the needle valve 12b as compared between the liquid-tight state and the gas-tight state concerning the inside of the suck 12d. In this connection, FIGS. 3 and 4 are based on the data obtained when the small injection is executed.

When the small injection is executed in the gas-tight state, as shown in FIG. 3, the amount of fuel that is actually injected from the nozzle holes 12e decreases as compared with the case in which the similar injection is executed in the liquid-tight state. One of the reasons is that fuel is consumed for filling up the suck 12d in the gas-tight state. In addition, a further reason is that as shown in FIG. 4, the lift amount of the needle valve 12b decreases in the gas-tight state due to the decrease in upward force of the needle valve 12b generated by the fuel in the suck 12d, as compared with in the liquid-tight state. Although the change in the fuel injection amount is herein described as an example, injection amount characteristics other than the fuel injection amount, and fuel spray also greatly vary depending on the difference whether the internal state of the suck 12d when fuel injection is started is the liquid-tight state or the gas-tight state.

Further, as described above, when the fuel injection valve 12 is brand new, the rotational position of the needle valve 12b with respect to the nozzle body 12a may vary for every lift operation. Therefore, in the brand new state, the above described gap may be formed depending on the aforementioned rotational position. As a result of this, the suck 12d when fuel injection is started is exposed to the phenomenon in which the internal state thereof varies between the liquid-tight state and the gas-tight state. More specifically, the liquid-tight state or the gas-tight state appears irregularly and as a result, distribution of the learned values has a bipolar variation in association with the liquid-tight state and the gas-tight state.

Accordingly, when the learning control of the small injection amount is executed under the situation in which the above described phenomenon occurs, the amount of fuel that is actually injected varies depending on whether the inside state of the suck 12d is the liquid-tight state or the gas-tight state. As a result of this, a variation (erroneous learning) may occur in the learned value for the small injection amount.

Meanwhile, in the internal combustion engine 10 of the present embodiment, multi injection may be executed in a manner according to operational condition. The multi injection herein refers to fuel injections including main injection for generating torque and predetermined small injection that is arbitrarily executed before and after the main injection. More specifically, in the present embodiment, as small injections included by the multi injection, one or two pilot injections and an after injection are executed, and a post injection is further executed as necessary in addition to them. In this connection, the pilot injection is an injection of small amount, which is executed in the compression stroke prior to the main injection in order to improve ignitability of fuel injected by the main injection. The after injection is an injection of small amount, which is executed in proximity to the main injection after the main injection and is executed with the purpose of, for example, facilitating reburning of soot that is caused by the main injection. The post injection is an injection that is executed in a late stage of the expansion stroke or in the exhaust stoke in order to supply unburned fuel into the exhaust passage 16 without use for burning itself, for the purpose of warming of the catalysts (oxidation catalyst 20 and the like).

The internal state of the suck 12d at the start of each small injection included in the multi injection is as follows. More specifically, as described above, under the situation in which the aforementioned gap may be formed depending on the rotational position of the needle valve 12b with respect to the nozzle body 12a, it is very difficult to determine whether the internal state of the suck 12d is the liquid-tight state or the gas-tight state after elapse of a period in which the decrease rate of the in-cylinder pressure is high during the expansion stroke (mainly, an early stage thereof). If the post injection is executed immediately after the elapse of the aforementioned period, the internal state of the suck 12d becomes the liquid-tight state by the post injection. As a result of this, the internal states of the suck 12d at the starts of the pilot injection, the main injection and the after injection at a cycle that arrives after the aforementioned post injection become all the liquid-tight states.

If, on the other hand, the post injection is not executed, it becomes impossible to grasp whether the internal state of the suck 12d is the liquid-tight state or the gas-tight state at the start of the first small injection (first injection that is executed at a timing in which fuel injected is not discharged into the exhaust passage 16) in the multi injection. In this connection, it is assumed that even when the post injection is not executed, the internal state of the suck 12d is the liquid-tight state at the start of the second and subsequent fuel injection in the multi injection.

Even when the first small injection is executed in the multi injection under a situation in which the aforementioned post injection in not executed, there is not a problem if the internal states of the suck 12d coincides with each other between the time of the execution of the learning control of the small injection amount reflected in the aforementioned first small injection and the time of actually starting the first small injection. However, the learning is executed so as to increase the small injection amount under the gas-tight state as compared with the liquid-tight state. Thus, executing the small injection under the liquid-tight state after the learning is executed under the gas-tight state results in that the fuel injection amount which is larger than an original and appropriate fuel injection amount is commanded to the fuel injection valve 12. Because of this, an increase in smoke emissions is caused, provided that a high load operation is being performed. Conversely, executing the small injection under the gas-tight state after the learning is executed under the liquid-tight state results in that the fuel injection amount which is smaller than an original and appropriate fuel injection amount is commanded to the fuel injection valve 12. Because of this, there is a concern that misfire may occur, provided that a low load operation is being performed.

[Characteristic Control in First Embodiment]

Accordingly, in the present embodiment, an arrangement is made such that the following control is performed when the post injection has not been executed at the last cycle and the small injection is executed first at the current cycle in a case in which variation in the learned value that is obtained by the learning control of the small injection amount is present. More specifically, if it is at the time of the low load operation in which the engine load is lower than a predetermined low load side threshold value, the fuel injection amount for the first small injection is increased, and if, on the other hand, it is at the time of the high load operation in which the engine load is higher than a predetermined high load side threshold value that is higher than the low load side threshold value, the fuel injection amount for the first small injection is decreased.

Figure 5:
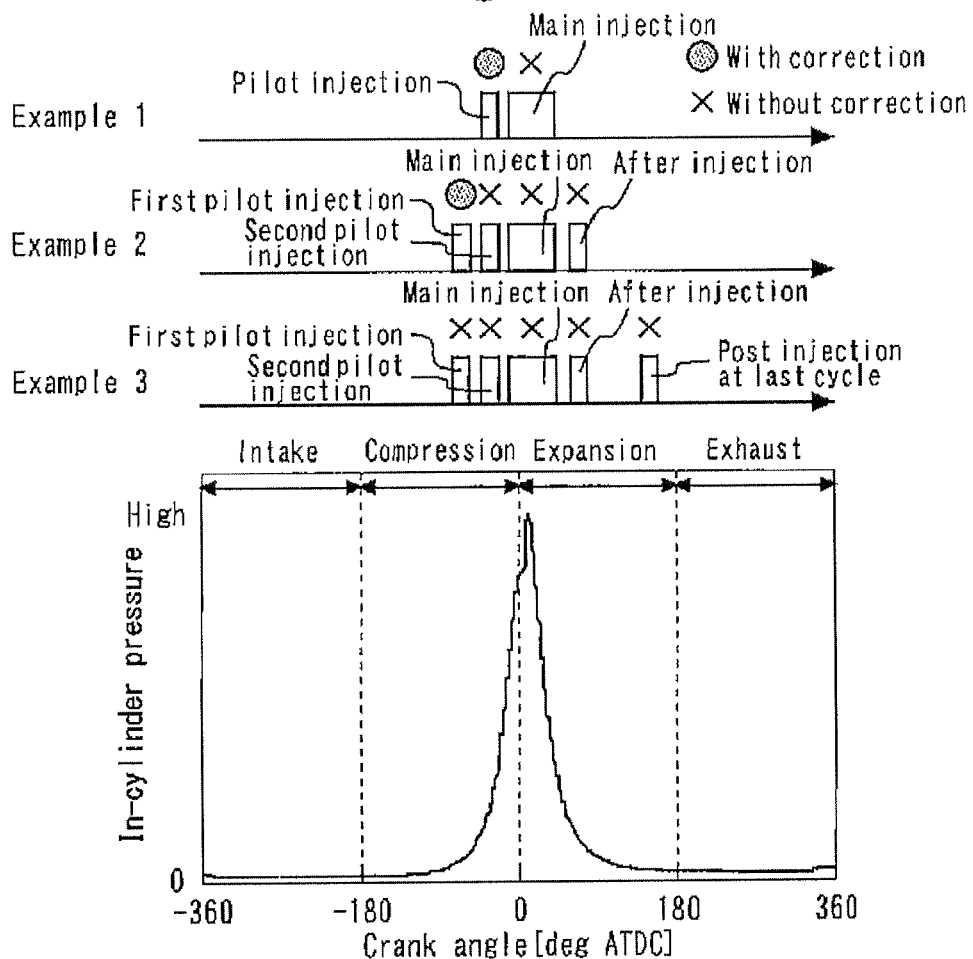
FIG. 5 is a diagram illustrating detailed examples of characteristic correction for small injection amount at the time of the execution of small injection.

FIG. 5 is a diagram illustrating detailed examples of characteristic correction for the small injection amount at the time of the execution of the small injection.

In FIG. 5, three examples are taken as the detailed examples of the multi injection. In "Example 1", one pilot injection and a main injection are executed; in "Example 2", two pilot injection, a main injection and an after injection are executed; and in "Example 3", a post injection is executed in addition to the ones in Example 2.

Figure 9:
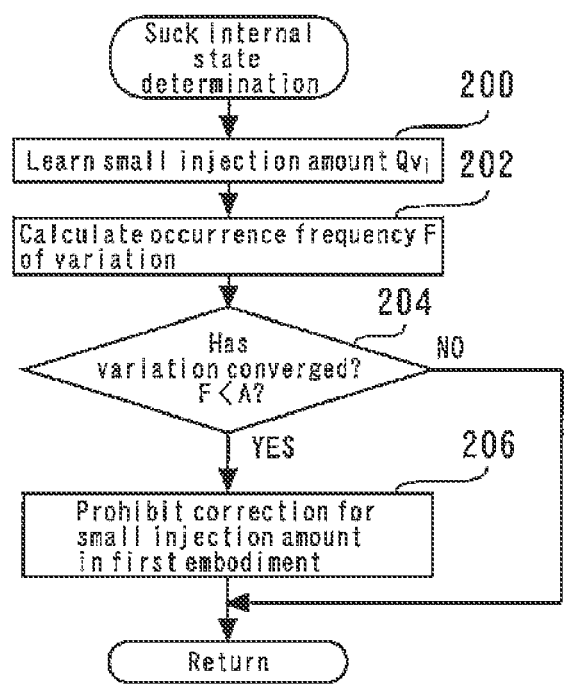
FIG. 9 is a flowchart of a routine that is executed in a second embodiment of the present invention.

Since in "Example 3" a post injection is executed at the last cycle, a correction for the small injection in the present embodiment is not performed in this case as shown in FIG. 9. On the other hand, "Example 1" and "Example 2" are subjected to the correction for the small injection amount in the present embodiment since the post injection is not executed at the last cycle in these cases. Specifically, in "Example 1", the pilot injection that is executed only one time is subjected to the aforementioned correction, and in "Example 2", the first pilot injection out of the pilot injections that are executed twice is subjected to the aforementioned correction.

Figure 6:
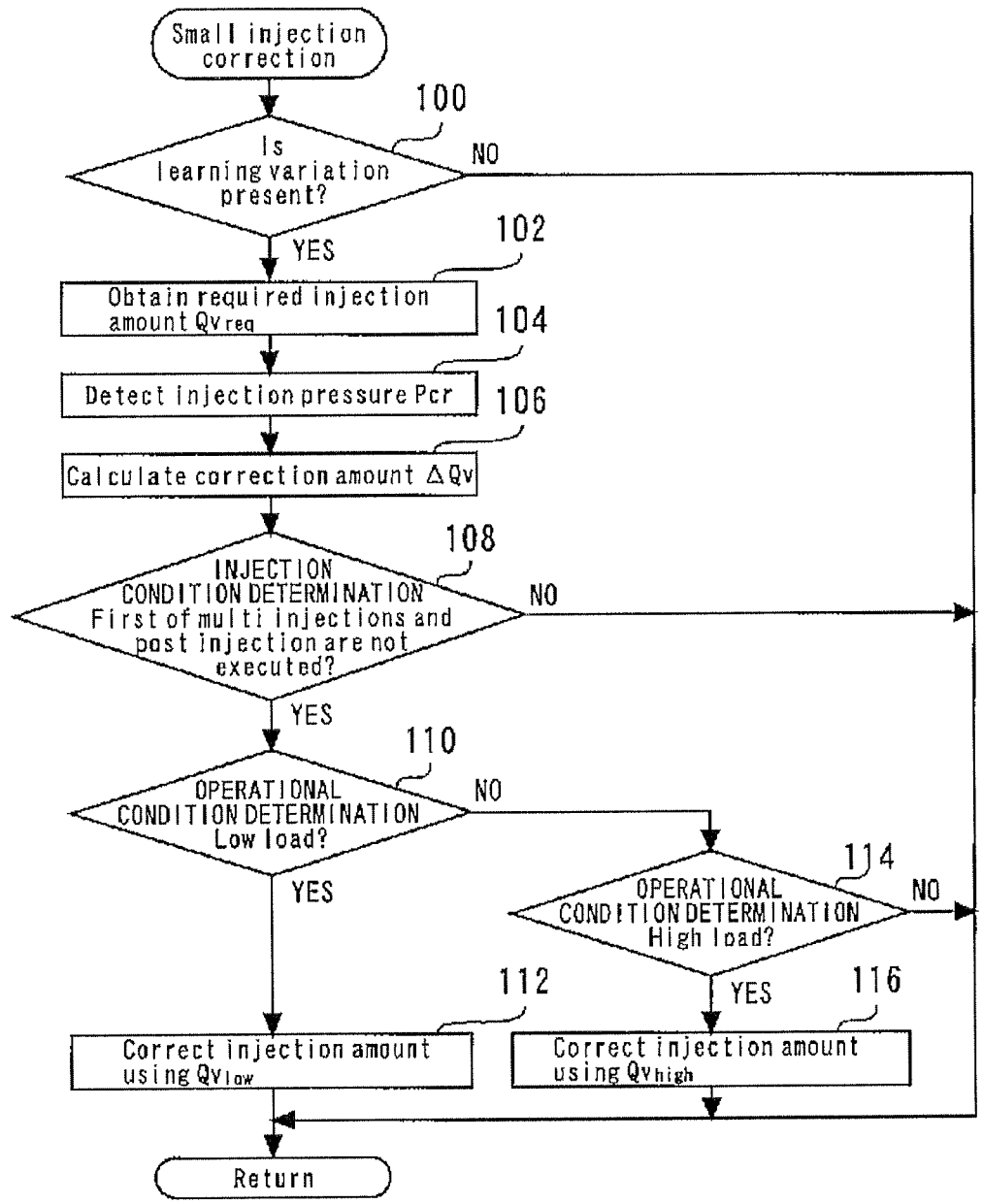
FIG. 6 is a flowchart of a routine that is executed in the first embodiment of the present invention.

FIG. 6 is a flowchart of the routine to be executed by the ECU 40 to implement the correction for the small injection amount at the time of the execution of the multi injection in the present first embodiment. It is noted that the present routine is executed repeatedly at predetermined control intervals.

In the routine shown in FIG. 6, first, it is determined whether or not a variation is present in the learned value that is obtained by the learning control of the small injection amount (step 100). Specifically, with reference to the results of learning that has been previously executed by predetermined number of times, it is judged whether or not a variation is present in the learned value (the correction amount for the small injection amount) $\Delta Qv$ that is calculated using the method described above (for example, whether or not the width of the variation is greater than or equal to a predetermined value).

If it is determined in aforementioned step 100 that a variation is present in the learned value, a required injection amount (a command value for the fuel injection valve 12) $Qv_{req}$ for the small injection is obtained (step 102). The required injection amount $Qv_{req}$ itself is set in advance in accordance with the operational condition of the internal combustion engine 10, and herein, a value in accordance with the current operational condition is obtained. Next, an injection pressure (fuel pressure in the common-rail 14) Pcr is detected by the common-rail pressure sensor 34 (step 104).

Figure 7:
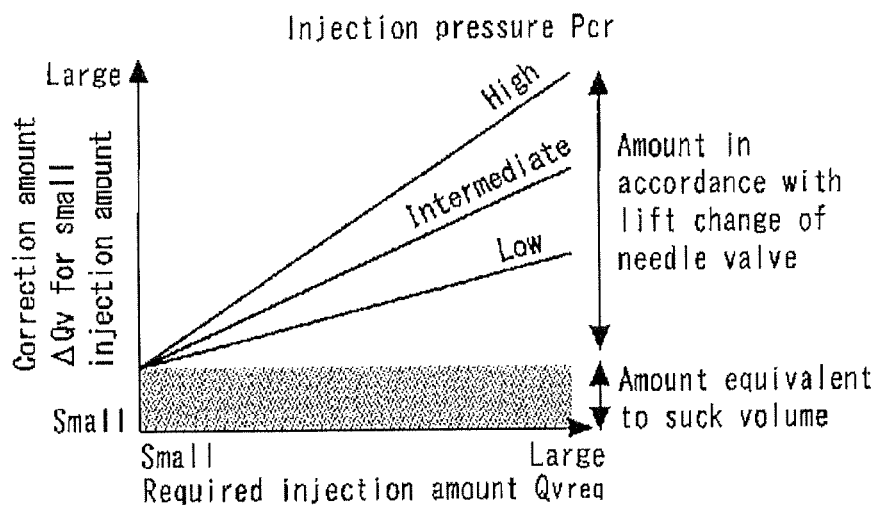
FIG. 7 is a graph showing the setting of a map that is included in an ECU in order to calculate a correction amount $\Delta Qv'$ for the small injection amount.

Next, a correction amount for the small injection (the learned value) $\Delta Qv'$ that is used under the following specific condition (the time when determination of aforementioned step 100 or 114 is established) is calculated (step 106). FIG. 7 is a graph showing the setting of a map that is included in the ECU 40 in order to calculate the correction amount $\Delta Qv'$ for the small injection amount.

As described above, causes for decreasing the small injection amount in the gas-tight state as compared with the liquid-tight state include the consumption of fuel for filling up the suck 12d and the decrease in the lift amount of the needle valve 12b due to the decrease in its upward force. Accordingly, as shown in FIG. 7, the correction amount $\Delta Qv'$ is set as a value (variable value), which is made up of the amount equivalent to the volume of the suck 12d (constant value) and an amount in accordance with a change in the lift amount of the needle valve 12b. When the injection pressure Pcr increases, the decreased amount of the fuel injection amount caused by the decrease in the lift amount of the needle valve 12b increases. Because of this, according to the setting shown in FIG. 7, the correction amount $\Delta Qv'$ increases with an increase in the injection pressure Pcr. In addition, according to the aforementioned setting, the correction amount $\Delta Qv'$ increases with an increase in the required injection amount $Qv_{req}$. In present step 104, with reference to the aforementioned map, the correction amount $\Delta Qv'$ that is suitable for the current operational state is calculated on the basis of the required injection amount $Qv_{req}$ and the injection pressure Pcr that are obtained in aforementioned steps 102 and 104.

Next, determination of fuel injection condition is performed (step 108). Specifically, it is determined whether or not a timing has been reached at which the first small injection in the multi injection is executed under the situation in which the post injection is not executed at the last cycle. If, as a result, the determination is positive, it is determined whether or not it is at the time of the low load operation in which the current engine load is lower than the predetermined low load side threshold value (step 110).

If the engine is determined to be in the low load operation in aforementioned 110, the required injection amount $Qv_{low}$ after correction is calculated as the command value for the current small injection (the first small injection in the multi injection) (step 112). The required injection amount $Qv_{low}$ after this correction is a value ($Qv_{req}+\Delta Qv'$) that is obtained by adding the correction amount $\Delta Qv'$ calculated in aforementioned step 106 to the required injection amount $Qv_{req}$ obtained in aforementioned step 102.

If, on the other hand, the engine is determined in aforementioned step 110 not to be in the low load operation, it is determined whether or not the engine is in the high load operation in which the current engine load is higher than the high load side threshold value (>the aforementioned low load side threshold value) (step 114). If, as a result, the present determination is positive, the required injection amount $Qv_{high}$ after correction is calculated as the command value for the current small injection (the first small injection in the multi injection) (step 116). The required injection amount $Qv_{high}$ after this correction is a value ($Qv_{req}-\Delta Qv'$) that is obtained by subtracting the correction amount $\Delta Qv'$ calculated in aforementioned step 106 from the required injection amount $Qv_{req}$ obtained in aforementioned step 102. In this connection, in a case in which the determination of aforementioned step 114 is negative, that is to say, at the time of the intermediate load operation, the correction for the required injection amount $Qv_{req}$ is not performed.

According to the routine shown in FIG. 6 described so far, when the post injection has not been executed at the last cycle and the first small injection is executed at the current cycle in a case in which a variation in the learned value that is obtained by the learning control of the small injection amount is noted, the fuel injection amount for the first small injection is increased if it is at the time of the low load operation, while the fuel injection amount for the first small injection is decreased if it is at the time of the high load operation.

In other words, according to the routine described above, it can be judged whether or not the internal state of the suck 12d is under the situation in which it irregularly varies between the liquid-tight state and the gas-tight state by determining whether or not a variation is present in the learned value. On that basis, the correction for the small injection amount according to the above described routine makes it possible to take a measure to be able to address a situation in which the aforementioned irregular change of the internal state of the suck 12d affects the small injection in the worst fashion in terms of the performance of the internal combustion engine 10 in each operational condition (low load or high load operational condition). Specifically, if it is at the time of the low load operational condition, the fuel injection amount is increased by use of the first small injection (pilot injection) in the multi injection, and thereby, worst-case scenario (an occurrence of misfire) can be suppressed with the minimal correction. In addition, if it is at the time of the high load operational condition, the fuel injection amount is decreased by use of the first small injection (pilot injection) in the multi injection, and thereby, worst-case scenario (an increase in smoke emissions) can be suppressed with the minimal correction.

It is noted that in the first embodiment, which has been described above, the ECU 40 performs the aforementioned learning control of the small injection amount, whereby the "learning execution means" in the present invention is realized, the ECU 40 performs the predetermined multi injection in a manner in accordance with the operational condition of the internal combustion engine 10 as illustrated in FIG. 5, whereby the "multi injection execution means" in the present invention is realized, and the ECU 40 performs a series of processing of the routine shown in FIG. 6, whereby the "fuel injection amount correction means" in the present invention is realized.

Second Embodiment

Next, a second embodiment of the present invention will be described with reference to FIGS. 8 and 9.

The system of the present embodiment can be implemented by using the hardware configuration shown in FIG. 1 and making the ECU 40 execute the routine shown in FIG. 9 described below, in addition to the routine shown in FIG. 6.

As described so far, according to the fuel injection valve 12 of the VCO type, the internal state of the suck 12d may vary between the liquid-tight state and the gas-tight state depending on the rotational position of the needle valve 12b when seated on the seat part 12a1, in the brand new state in which mechanical familiarity is not being ensured concerning the contact between the needle valve 12b and the nozzle body 12a. However, the degree of outflow of fuel from the suck 12d at the time of the decrease in the in-cylinder pressure during the expansion stroke may vary with time. For example, in the case of the VCO type, the familiarity between the needle valve 12b and the nozzle body 12a is gradually ensured by repeating the lift operation of the needle valve 12b. As a result of this, the communication between the suck 12d and the nozzle holes 12e is stably shut off when the valve is closed. Therefore, the internal state of the suck 12d at the time of the learning of the small injection amount becomes stable in the liquid-tight state.

Figure 8:
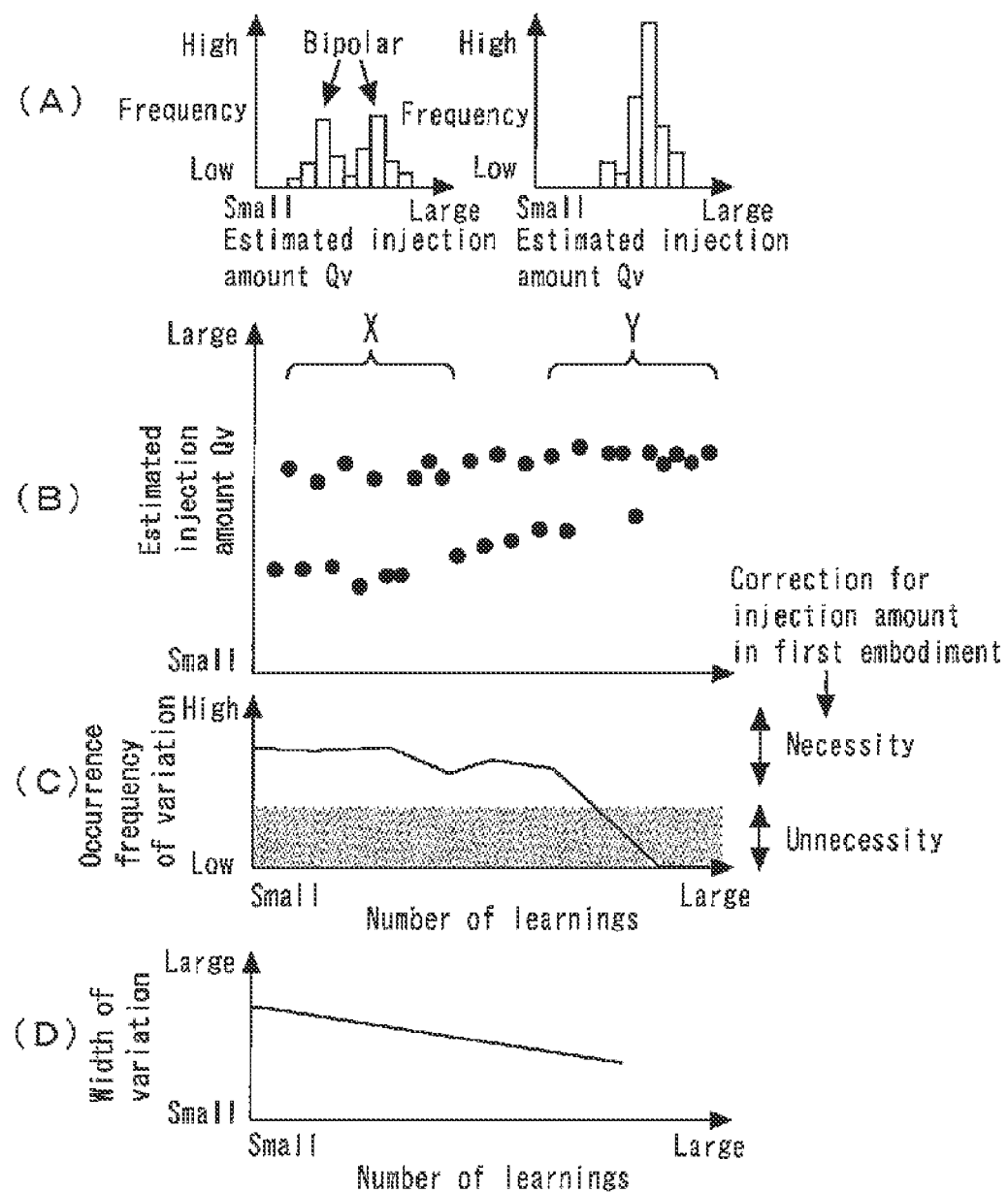
FIG. 8 is a diagram illustrating a change in variation of an estimated injection amount Qv in association with a change with time, at the time of the learning of the small injection using the fuel injection valve of a VCO type.

FIG. 8 is a diagram illustrating a change in variation of the estimated injection amount Qv in association with a change with time, at the time of the learning of the small injection using the fuel injection valve 12 of the VCO type.

The degree of outflow of fuel from the suck 12d varies with time (for example, due to the aforementioned familiarity is ensured with time) for the reason described above.

Specifically, at the initial stage of the learning in which the number of the learnings is small ("X" in FIG. 8), the internal state of the suck 12d is not stable, and therefore, the degree of outflow of fuel from the suck 12d largely varies. Because of this, the variation in the estimated injection amount Qv at the time of the learning of the small injection becomes large (becomes bipolar) as shown in FIGS. 8(A) and 8(B), and as a result, the correction amount (the learned value) ΔQv for obtaining the estimated injection amount $Qv_{req}$ also varies.

If, on the other hand, a large number of the learnings are executed, the familiarity of the shape of the suck 12d allows the inside thereof to become stable ("Y" in FIG. 8), and thereby, the bipolar variation is resolved as shown in FIG. 8(A). As a result of this, the occurrence frequency F of the variation of the estimated injection amount Qv (the same as the learned value ΔQv) decreases with time as shown in FIG. 8(C), and the width of the variation also decreases with time.

Accordingly, in the present embodiment, an arrangement is made such that the occurrence frequency F of the variation of the estimated injection amount Qv is calculated on the basis of the record of the injection amount Qv (learning parameter) that has been previously estimated by predetermined number of times. In addition, when the occurrence frequency F of the variation has become lower than a predetermined value A, the variation is determined to have converged, and the correction of the small injection amount in the above described first embodiment is prohibited.

FIG. 9 is a flowchart of the routine to be executed by the ECU 40 to implement the control in the present second embodiment. It is noted that the processing of the present routine is executed every time before executing the learning control of the small injection or once with respect to a predetermined plurality of executions of the learning control.

In the routine shown in FIG. 9, first, the learning control of the small injection amount is executed (step 200). As a result of this, the estimated injection amount $Qv_i$ based on the variation in engine speed ΔNe as a result of the current injection for the learning is calculated. Next, the occurrence frequency F of the variation of the injection amount $Qv_i$ that has been previously estimated by predetermined number of times (for example, ten times) is calculated (step 202).

Next, it is determined whether or not the occurrence frequency F of the variation that is calculated in aforementioned step 202 is lower than the predetermined value A (step 204). The predetermined value A in present step 204 is a value that is set in advance as a threshold value of the occurrence frequency F for judging whether or not the internal state of the suck 12d has become stable in the liquid-tight state due to a change with time.

If it is determined in aforementioned step 204 that the occurrence frequency F of the variation is lower than the aforementioned predetermined value A, the correction of the small injection amount according to the routine shown in FIG. 6 in the first embodiment is prohibited (step 206).

According to the routine shown in FIG. 9 described so far, when the variation in the estimated injection amount Qv (in other words, the variation in the learned value) has converged due to a change with time, the correction for the small injection amount in the above described first embodiment is prohibited. It can be judged that the internal state of the suck 12d at the time of the learning is stable in the liquid-tight state if the variation has converged. Therefore, according to the aforementioned routine, it is determined whether or not the variation has converged, and thus, an overcorrection can be prevented from being made by the processing of the first embodiment.

Incidentally, in the second embodiment, which has been described above, it is determined whether or not the variation has converged on the basis of the occurrence frequency F of the variation of the estimated injection amount Qv at the time of the learning of the small injection amount. However, in the present invention, the method for determining whether or not a variation in the learning parameter has converged is not limited to the one described above. More specifically, as the aforementioned learning parameter, the above described learned value (the correction amount) ΔQv may be used instead of the estimated injection amount Qv. Further, it may be determined whether or not the aforementioned variation has converged by use of the width of the variation instead of the occurrence frequency F of the aforementioned variation or in addition thereto.

It is noted that in the second embodiment, which has been described above, the ECU 40 performs a series of processing of the routine shown in FIG. 9, whereby the "injection amount correction prohibition means" in the present invention is realized.

Incidentally, in the first and second embodiments, which have been described above, the description has been made taking an example of the internal combustion engine 10 that is a diesel engine as one example of a compression ignition internal combustion engine. However, the internal combustion engine that is applied to the present invention is not limited to the compression ignition internal combustion engine. More specifically, a spark ignition internal combustion such as a gasoline engine may be applied, provided that the fuel injection valve in the present invention is included and one or a plurality of small injection is executed during one cycle, in addition to main injection for generating a torque.

In addition, in the above described first and second embodiments, the description of the control in the present invention has been made taking an example of the fuel injection valve 12 of the VCO type (see FIG. 2). As already described, according to such fuel injection valve 12 of the VCO type, a gap may be formed between the distal end of the needle valve 12b and the wall surface 12f depending on the rotational position of the needle valve 12b at the time of being seated on the seat part 12a1, especially in the brand new state. As a result of this, the suck 12d when fuel injection is started is exposed to the phenomenon in which its internal state varies between the liquid-tight state and the gas-tight state. However, the configuration of the fuel injection valve that is applied to the present invention is not limited to the one of the VCO type described above.

More specifically, the fuel injection valve that is applied to the present invention requires simply that a nozzle body is provided that includes a fuel receiving part provided at a downstream side of a seat part with which a seat contact part of a needle valve comes into contact, and at least one nozzle hole. For example, a fuel injection valve (so-called, fuel injection valve of MS (Mini Sac) nozzle type) may be used that includes a configuration in which the distal end of a needle valve is not extended to the extent that the communication between a nozzle hole and a fuel receiving part (suck) can be shut off as in the VCO type and the nozzle hole is connected with a suck (fuel receiving part) of small volume. Even if a fuel injection valve has such a configuration, the amount of fuel extruded from the suck by the expanded gas bubbles at the early stage of the expansion stroke varies due to a variation in the amount of the gas bubbles in the suck after injection. This becomes a cause for a variation in the learned value at the time of the execution of the learning control of the fuel injection amount such as small injection amount. In addition, such variation in the learned value may vary with time. Therefore, application of the controls of the above described first and second embodiment is effective also in the internal combustion engine that includes the fuel injection valve having such a configuration.

DESCRIPTION OF SYMBOLS 10 internal combustion engine
12 fuel injection valve
12a nozzle body of fuel injection valve
12a1 seat part of nozzle body
12b needle valve of fuel injection valve
12b1 seat contact part of needle valve
12c internal fuel passage
12d suck
12e nozzle hole
12f wall surface of nozzle body
14 common-rail
16 exhaust passage
18 turbo supercharger
20 oxidation catalyst
22 DPF
24 intake passage
26 air cleaner
28 intercooler
30 intake throttle valve
32 air flow meter
34 common-rail pressure sensor
36 intake air pressure sensor
40 ECU (Electronic Control Unit)
42 crank angle sensor
44 in-cylinder pressure sensor
46 accelerator position sensor

The invention claimed is:

1. A control apparatus for an internal combustion engine, comprising a fuel injection valve which is capable of directly injecting fuel into a cylinder,
wherein the fuel injection valve includes:
a needle valve that has a seat contact part at its distal end; and
a nozzle body that has a seat part with which the seat contact part comes into contact, a fuel receiving part formed at a downstream side of the seat part, and at least one nozzle hole formed at the downstream side of the seat part,
wherein the control apparatus further comprises a controller that is programmed to:
execute learning control of fuel injection amount for learning the fuel injection amount;
execute, using the fuel injection valve, one or a plurality of small injections during one cycle in addition to main injection for generating a torque of the internal combustion engine;
determine whether or not post injection has been executed at a last cycle of the internal combustion engine so as to determine whether it can be determined whether the fuel receiving part is in a liquid-tight state or a gas-tight state; and
when post injection has not been executed at a last cycle of the internal combustion engine and the small injection is executed first at a current cycle in a case in which a variation in a learned value for fuel injection amount of the learning control is present, increase the fuel injection amount of a first small injection at the current cycle at a time of low load operation and decrease the fuel injection amount of the first small injection at a time of high load operation.

2. The control apparatus for an internal combustion engine according to claim 1,
wherein the fuel injection valve is configured such that in a state in which the needle valve is seated on the seat part, part of the distal end of the needle valve shuts off a communication between the nozzle hole and the fuel receiving part.

3. The control apparatus for an internal combustion engine according to claim 1,
wherein when a variation in a learning parameter of the learning control has converged, the controller prohibits a correction for the fuel injection amount.

4. A control apparatus for an internal combustion engine, comprising a fuel injection valve which is capable of directly injecting fuel into a cylinder,
wherein the fuel injection valve includes:
a needle valve that has a seat contact part at its distal end; and
a nozzle body that has a seat part with which the seat contact part comes into contact, a fuel receiving part formed at a downstream side of the seat part, and at least one nozzle hole formed at the downstream side of the seat part, wherein the control apparatus further comprises:
learning execution means that executes learning control of fuel injection amount for learning the fuel injection amount;
multi injection execution means that executes, using the fuel injection valve, one or a plurality of small injections during one cycle in addition to main injection for generating a torque of the internal combustion engine;
determination means that determines whether or not post injection has been executed at a last cycle of the internal combustion engine so as to determine whether it can be determined whether the fuel receiving part is in a liquid-tight state or a gas-tight state; and
fuel injection amount correction means that when post injection has not been executed at a last cycle of the internal combustion engine and the small injection is executed first at a current cycle in a case in which a variation in a learned value for fuel injection amount of the learning control is present, increases the fuel injection amount of a first small injection at the current cycle at a time of low load operation and decreases the fuel injection amount of the first small injection at a time of high load operation.

\* \* \* \* \*